(12) United States Patent
Space et al.

(10) Patent No.: US 11,344,863 B2
(45) Date of Patent: *May 31, 2022

(54) SYSTEMS, DEVICES AND METHODS FOR REGENERATION OF A SORBENT

(71) Applicant: THE BOEING COMPANY, Chicago, IL (US)

(72) Inventors: David R. Space, Snohomish, WA (US); Stephen M. Trent, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 996 days.

This patent is subject to a terminal disclaimer.

(21) Appl. No.: 16/030,443

(22) Filed: Jul. 9, 2018

(65) Prior Publication Data

US 2020/0009533 A1    Jan. 9, 2020

(51) Int. Cl.
*B01J 20/34* (2006.01)
*B64D 13/06* (2006.01)

(52) U.S. Cl.
CPC ....... *B01J 20/3483* (2013.01); *B01J 20/3491* (2013.01); *B64D 13/06* (2013.01); *B64D 2013/0651* (2013.01)

(58) Field of Classification Search
CPC .............. B01J 20/3483; B01J 20/3491; B01D 53/0446; B64D 13/06
See application file for complete search history.

(56) References Cited

U.S. PATENT DOCUMENTS

| 7,871,038 | B2 | 1/2011 | Space et al. |
| 8,952,327 | B2 | 2/2015 | Patterson et al. |
| 9,776,725 | B2 | 10/2017 | Fox et al. |
| 10,737,791 | B2 * | 8/2020 | Space ................... B01D 53/62 |
| 2016/0214723 | A1 | 7/2016 | Fox et al. |
| 2016/0318613 | A1 * | 11/2016 | Ludvik ................. B64D 13/06 |
| 2017/0320582 | A1 | 11/2017 | Fox et al. |
| 2017/0334565 | A1 | 11/2017 | Fox et al. |
| 2017/0341762 | A1 | 11/2017 | Breigenzer et al. |

OTHER PUBLICATIONS

USPTO; U.S. Appl. No. 15/724,647, filed Oct. 4, 2017.

* cited by examiner

*Primary Examiner* — Yong L Chu
(74) *Attorney, Agent, or Firm* — Sage Patent Group (57) ABSTRACT

An environmental control system is provided. The system includes a sorbent regeneration device. The sorbent regeneration device includes at least one regenerative sorbent material operative to remove gas substances from air. The at least one regenerative sorbent material is operatively coupled to a source of hot air. The sorbent regeneration device further includes at least two bypass valves that are operative to selectively direct some or all of the hot air into the at least one regenerative sorbent material. The environmental control system further includes one or more air quality sensors and a controller operatively connected to the at least two bypass valves and the one or more air quality sensors. The controller is operative to control one or more of the at least two bypass valves in response to air quality determined from the air quality sensors.

20 Claims, 7 Drawing Sheets

SYSTEMS, DEVICES AND METHODS FOR REGENERATION OF A SORBENT

TECHNICAL FIELD

The present disclosure relates generally to systems, devices, and methods of automated environmental control, and in particular to environmental control systems, devices, and methods on an aerospace vehicle, including regenerating sorbent materials during flight operations.

BACKGROUND

Standard sea level (SSL) air is 59° F. (15° C.) and at a pressure of 14.7 psi (101.4 KPa). At 35,000 feet (10,668 meters), the air is −66° F. (−54° C.) and 3.5 psi (24.1 KPa), contains very little moisture and may contain varying levels of ozone ($O_3$). Accordingly, to use outside air for consumption in passenger aircraft, the outside air is pressurized and heated. Most aircraft ventilate using 50% filtered, recycled air combined with 50% outside air.

Amounts of ozone are typically controlled to very low levels prior to entering cabin space of the aircraft. A conventional approach to maintaining interior air quality aboard passenger aircraft has been to ventilate the aircraft with a high ventilation rate and filter the interior air as part of a recirculation process. Removal of volatile organic compounds (VOC) and other compounds is typically through ventilation and augmented with the use of adsorbing filters. Such filters are typically inspected and replaced on scheduled maintenance intervals.

SUMMARY

In one example, an environmental control system is provided. The system includes a sorbent regeneration device. The sorbent regeneration device includes at least one regenerative sorbent material operative to remove gas substances from air. The at least one regenerative sorbent material is operatively coupled to a source of hot air. The sorbent regeneration device further includes at least two bypass valves that are operative to selectively direct some or all of the hot air to the at least one regenerative sorbent material. The device further includes one or more air quality sensors and a controller operatively connected to the at least two bypass valves and the one or more air quality sensors. The controller is operative to determine an air quality value based on signals from the one or more air quality sensors and to control one or more of the at least two bypass valves in response to the air quality value. In another example, alone or in combination with any one of the previous examples, at least one of the bypass valves is a three-way valve.

In one example, the sorbent regeneration device includes at least two regenerative sorbent materials that can be regenerated independently. The controller is further operative to selectively direct the hot air independently to any of the at least two regenerative sorbent materials for regeneration. In another example, alone or in combination with any one of the previous examples, the controller is further operative to selectively apply a vacuum pressure independently to any of the at least two regenerative sorbent materials to assist with the regeneration.

In another example, alone or in combination with any one of the previous examples, the controller is further operative to apply a vacuum pressure to the regenerative sorbent material.

In another example, alone or in combination with any one of the previous examples, the one or more air quality sensors are disposed on opposite sides of the at least one regenerative sorbent material. In another example, alone or in combination with any one of the previous examples, the sorbent regeneration device includes one or more particulate filters.

In another example, alone or in combination with any one of the previous examples, the environmental control system further includes a volatile organic compound (VOC)/ozone converter and/or a carbon dioxide removal device ($CO_2$ removal device).

In another example, alone or in combination with any one of the previous examples, the hot air has a temperature of at least 150° F. (66° C.).

In another example, a sorbent regeneration device is provided, the device comprising at least one regenerative sorbent material operative to remove gas substances from air. The sorbent regeneration device receives hot air controlled by at least two three-way bypass valves, each of the at least two three-way bypass valves operative to selectively direct some or all of the hot air into or around the at least one regenerative sorbent material, selectively direct some or all of a volume of air into the at least one regenerative sorbent material, and selectively direct some or all of the volume of air that has passed through the regenerative sorbent material to an external environment. The controller controls one or more of the two three-way bypass valves.

In one example, the regenerative sorbent material includes activated carbon. In another example, the regenerative sorbent material includes zeolites. In another example, the regenerative sorbent material includes organometallic compounds (metal organic frameworks), or sintered metal.

In another example, a method of regenerating a sorbent of an environmental control system is provided. The method comprises monitoring air quality by receiving one or more signals from one or more air quality sensors. The method further comprises responding to the one of more signals from one or more air quality sensors via a controller, and manipulating at least two bypass valves of a sorbent regeneration device. The controller manipulates the at least two bypass valves of the sorbent regeneration device to selectively route hot air to the regenerative sorbent material such that at least a portion of the regenerative sorbent material is heated for a time and a temperature capable of removing at least one substance from the sorbent and regenerating at least a portion of the regenerative sorbent material.

In another example, the method further comprises operatively controlling an amount of the hot air routed through the regenerative sorbent material in response to air quality determined from signals from the one or more air quality sensors. In another example, alone or in combination with any one of the previous examples, the amount of the hot air routed through the regenerative sorbent material is determined by signals from one or more air quality sensors positioned on opposite sides of the regenerative sorbent material.

In another example, alone or in combination with any one of the previous examples, the method further comprising comparing two or more signals received from the one or more air quality sensors, using the controller, and manipulating one or more of the bypass valves based on the comparison. In another example, alone or in combination with any one of the previous examples, regenerating the regenerative sorbent material further comprises applying a vacuum pressure to the regenerative sorbent material. In another example, alone or in combination with any one of the previous examples, regenerating the regenerative sorbent material further comprises applying a vacuum pressure and hot air to the regenerative sorbent material.

In another example, alone or in combination with any one of the previous examples, two or more regenerative sorbent materials (the same or different materials) are employed, and the method further comprises controlling the hot air to only one of the regenerative sorbent materials using the controller. In another example, alone or in combination with any one of the previous examples, the method further comprises applying a vacuum pressure to only one of the regenerative sorbent material.

In another example, alone or in combination with any one of the previous examples, the method further comprises activating the at least one of the at least two bypass valves to selectively introduce a flow of air to one or more particulate filters. In another example, alone or in combination with any one of the previous examples, the method further includes (i) activating at least one of the at least two bypass valves so as to selectively introduce hot air to a CO2 removal device comprising CO2 sorbent material; and (ii) heating and applying vacuum pressure to at least a portion of the regenerative sorbent material for a time and a temperature capable of removing CO2 from the sorbent material and regenerating at least the portion of the CO2 sorbent material.

In another example, alone or in combination with any one of the previous examples, the method further comprises detecting an anomaly in a bypass valve; outputting an indication of the anomaly to an alert device; isolating the bypass valve having the anomaly; and compensating for the anomaly.

DETAILED DESCRIPTION

The present disclosure will now be described more fully hereinafter with reference to the accompanying drawings, in which examples of the disclosure are shown. This disclosure should not be construed as limited to the examples set forth herein. Rather, these examples are provided so that this disclosure will be thorough and complete, and will fully convey the scope of the disclosure to those skilled in the art. Like numbers refer to like elements throughout.

According to figures and examples of the present disclosure, and with reference to the figures, an Environmental Control System 10 (hereinafter "ECS 10") is provided. The ECS 10 includes an air supply airflow path that includes an external air supply device 16 for moving a volume of air from one portion of an interior to another portion of the interior. The volume of air of the air supply airflow path can be monitored using sensors that provide signals representative of one or more characteristics of the volume of air, such as an air quality value determined by the controller 30, e.g., by comparing signals from two or more air quality sensors 18, 24, 40, 50.

As used herein, the term "air quality sensor" refers to any sensor that is operative to detect and report one or more physical properties of air, such as temperature, pressure, humidity, oxygen level, the presence and/or level of one or more gaseous contaminants such as $CO_2$, ammonia, VOCs, and the presence and/or level of one or more particulate contaminants, e.g., dust. Any suitable air quality control sensors can be integrated with the controller, computer systems, apparatuses, and computer programs configured to perform the actions of the disclosed methods can be used.

Air quality sensors 18, 24, 40, 50 can output an analog or digital signal indicative of a measured parameter and/or can include a digital interface operative to respond to queries from the controller 30. Air quality sensors 18, 24, 40, 50 can continuously, semi-continuously, periodically, or on-demand monitor the air in a volume or airflow directed over the sensor, and can continuously or periodically output a signal or digital communication indicative of the measured parameter(s). Alternatively, an air quality sensor 18, 24, 40, 50 can obtain and/or store in memory 32 data at a sample point and generate an output only upon a command from the controller 30. In another example, an air quality sensor 18, 24, 40, 50 can continuously or periodically monitor air and output a signal autonomously upon detecting a predetermined or programmed condition (e.g., over a threshold amount stored in memory 32), such as the presence of smoke or an excessive level of a gaseous contaminant.

Implementation may include one or more of the following features. In one example, ECS 10 includes both an air supply path 11 and a recirculation airflow path 13. The air supply path 11 takes in external air, e.g., from an engine or compressor, optionally directs the external air through a VOC/ozone converter 22, and conditions and mixes the external air with air recirculated from the interior volume 14. The quality of air handled by the air supply path 11 can be monitored using air quality sensors 18, 24.

Recirculation airflow path 13 includes a recirculation device 52 for moving a volume of air from one portion of an interior to another portion of the interior. The quality of air handled by the recirculation airflow path 13 can be monitored using air quality sensors 40, 50. The recirculation airflow path 13 includes a sorbent regeneration device 100. The sorbent regeneration device 100 includes o regenerative sorbent material 44 designed for absorbing or otherwise containing contaminants present in the recirculating air. Sorbent regeneration device 100 is further configured with one or more bypass valves to control the flow of hot air 56 or vacuum pressure 54 through the sorbent material 44 as well as to facilitate the discharge of the contaminants removed from the sorbent material 44 during a regeneration, for example, in the case of a vehicle, discharging external to the vehicle.

The sorbent material 44 of the sorbent regeneration device 100 can be configured as a filter. In one example, the sorbent material 44 can be regenerated by supplying hot air 56 and/or vacuum pressure 54 to the sorbent material 44, such that VOCs and other substances are at least partially removed from the sorbent material 44. Thus, the ECS 10 can include a sorbent regeneration device 100 having at least one contaminant sorbent material that is regenerable, in order to provide ongoing sorption/regeneration or desorption of contaminants (i.e. multiple sorption and desorption cycles). In one example the sorbent regeneration device 100 includes an assembly housing a regenerable contaminant sorbent material (e.g., a removable/replaceable filter or canister assembly) and a conduit with bypass valve 42 arranged to allow cabin air flow air over the regenerable contaminant sorbent material of the sorbent regeneration device 100 and return the treated air to the interior volume 14 of the passenger cabin, and a conduit with bypass valve 46 arranged to allow hot air 56 to flow over the regenerable contaminant sorbent material to desorb contaminants from the sorbent material. Additionally, the regenerable contaminant sorbent material can be exposed to a pressure below atmospheric pressure together with hot air 56 to encourage desorption and to expel the desorbed contaminants via waste gas outflow/vacuum 54.

The regenerable contaminant sorbent materials are capable of sorbing contaminant at temperatures of that of a cabin of an aerospace vehicle during operation. In one example, regenerable contaminant sorbent materials are capable of adsorbing contaminant at temperatures between −10° C. to 40° C.

In one example, the sorbent material of the sorbent regeneration device 100 is arranged therein to provide a pressure drop of 100 mbar or less, 70 mbar or less, or 50 mbar or less, 25 mbar or less, 10 mbar or less. In one example, the pressure drop, will be between 1 mbar to 5 mbar. The regenerable contaminant sorbent material of the sorbent regeneration device 100 is generally capable of sorbing contaminant at temperatures within a sorption temperature range that corresponds to a range of cabin environments of an aerospace vehicle during operation.

Desorption of contaminant (regeneration) from regenerable contaminant sorbent materials of the sorbent regeneration device 100 occur above a certain temperature (i.e., the regeneration temperature). In one example, the regeneration temperature of the regenerable contaminant sorbent materials of the sorbent regeneration device 100 useful in the present disclosure includes the range of 122° F. (50° C.) to 248° F. (120° C.), depending on the hot air 56 temperature and the vacuum pressure 54 the contaminant sorption material is exposed to during regeneration under the operation conditions of the ECS 10.

Contaminant sorbent materials of the sorbent regeneration device 100 can be activated carbon-based sorption materials, zeolites, sintered metal, and/or MOFs (metal-organic frameworks). Contaminant sorbent materials of the sorbent regeneration device 100 can be immobilized, e.g. in a solid support. The nature of the solid support is not limited. The solid support may be a polymeric solid support. The solid support may be an inorganic solid support. Suitable polymeric supports include high temperature polymer solid supports, or fiber-reinforced solid supports. One example, the polymeric support is porous. In another example, the solid support is the contaminant sorbent material, e.g., activated carbon, sintered metal solid supports, zeolite, and MOF solid supports. In one example, the contaminant sorbent material is an inorganic solid support that is porous, e.g., porous activated carbon, sintered metal, zeolites, and MOF solid supports.

The ECS 10 further includes a controller 30 operatively connected to the external air supply device 16 of the air supply path 11, recirculation device 52 of the recirculation airflow path 13, sorbent regeneration device 100, and one or more air quality sensors 18, 40, 50. Controller 30 is operative to control bypass valves 20, 42, and 46 of the sorbent regeneration device 100 in response to signals from the air quality sensors 18,40, and 50. In one example, controller 30 can alert a person, e.g., flight crew, if an amount of VOCs present in the recirculating air is outside predetermined or programmable parameters. Implementation of the described techniques may include hardware, a method or process, or computer software on a computer-accessible medium.

In one example, a recirculation device 52 is operative to selectively move and supply air in interior volume 14 to sorbent regeneration device 100. In one example, sorbent regeneration device 100 includes a plurality of banks, e.g., first sorbent bank 48a, second sorbent bank 48b, each containing a sorbent material 44, 44a. In one example, the sorbent material 44 includes at least two sorbent materials 44, 44a positioned in separate sorbent banks 48a, 48b.

In one example, controller 30 is operative to cause sorbent regeneration device 100 to direct recirculated air to a second sorbent bank 48b when regenerating a sorbent in the first sorbent bank 48a. The plurality of banks 48a, 48b can be isolated from each other by bypass valves 42, 46, 46a and 46b, each bypass valves 42, 46, 46a, and 46b, controlled by the controller 30, to selectively direct some or all of an airflow of hot air 56 or vacuum pressure 54 via the bypass valves 42, 46, 46a, and 46b into sorbent material 44. In one example, the controller 30 is operative to control an amount of hot air routed through sorbent regeneration device 100 in response to input from the air quality sensors 40, 50.

Sorbent regeneration device 100 is operatively coupled to waste gas outflow that provides generating vacuum pressure 54 to sorbent material 44. In another example, sorbent regeneration device 100 is operatively coupled to waste gas outflow that provides generating vacuum pressure 54 to sorbent banks 48a, 48b and sorbents 44, 44a (which may be the same or different sorbent materials). The exterior of an aircraft is at very low pressure, effectively a vacuum, and opening one or more of the bypass valves 42, 46, 46a and 46b to the waste gas outflow/vacuum 54 effectively creates a vacuum condition on the sorbent material 44 that assists with removing one or more contaminants from sorbent material 44.

In one example, two or more air quality sensors 40, 50 are positioned on opposite sides of sorbent regeneration device 100 and the air quality sensors 40, 50 provide signals to the controller 30 representative of the quality of air before and after air passes through the sorbent material 44, 44a of sorbent regeneration device 100. In one example, the two or more air quality sensors 40, 50 are an upstream air quality sensor 40 positioned upstream of the sorbent material 44 of sorbent regeneration device 100 and a downstream air quality sensor 50 positioned downstream of the sorbent material 44. Regeneration of the sorbent material 44 can be maintained by the controller 30 in response to a difference in air quality determined from comparing outputs of the upstream and downstream air quality sensors 40, 50.

In response to a difference in air quality determined from comparing outputs of the air quality sensors 40, 50, controller 30 is operative to manipulate the bypass valves 42, 46, 46a and 46b so as to direct hot air 56 at a temperature and for a duration capable of removing contaminants and to regenerate the sorbent material 44, 44a of sorbent regeneration device 100. In one example, controller 30 is operative to manipulate bypass valves 42, 46, 46a and 46b so as to provide vacuum pressure 54 for a duration capable of removing contaminants and to regenerate the sorbent material 44, 44a of sorbent regeneration device 100. Controller 30 is also operative to manipulate bypass valves 42, 46, 46a and 46b so as to provide filtered air to the recirculation airflow path 13.

In one example, the sorbent material 44 uses a sorbent to sorb contaminant gases from the air. In one example, the controller 30 is operative to cause sorbent regeneration device 100 to remove contaminants from the sorbent of sorbent material 44 by applying vacuum pressure 54 in combination with the hot air 56 to sorbent regeneration device 100. In one example, the sorbent material 44 includes activated carbon, zeolites, metal organic frameworks, or sintered metal to sorb contaminant gases from the air.

As used herein, "hot air" refers to high-temperature air at a temperature capable of removing (via volatization) at least one component that is sorbed or otherwise associated with or contained by the sorbent material 44, with the proviso that the temperature of the hot air 56 is at or below the maximum regeneration temperature of the sorbent material 44 or the components and housing.

In one example, the controller 30 is operative to cause sorbent regeneration device 100 to remove contaminants present on or in the sorbent material 44 by applying hot air 56 to the sorbent at a temperature of at least 150° F. (66° C.). In one example, hot air 56 at a temperature of at least 150° F. (66° C.) is trim air from a jet engine, to remove at least a portion of the contaminant gases absorbed on the sorbent material 44. In one example, hot air 56 at a temperature of at least 150° F. (66° C.) is air heated by a heater. In one example, hot air 56 at a temperature of at least 150° F. (66° C.) is trim air from, for example, a jet engine or other air supply source, used in combination with vacuum pressure 54 to remove at least a portion of the contaminant gases absorbed on the sorbent material 44. In one example, hot air 56 at a temperature of at least 150° F. (66° C.) is air heated by a heater used in combination with a vacuum pressure 54 to remove at least a portion of the contaminant gases absorbed on the sorbent material 44. In another example, hot air 56 is sourced upstream from air conditioning system 26. In another example, hot air 56 is sourced upstream from air conditioning system 26 and downstream of VOC/ozone converter 22.

In one example, the controller 30 is operative to control an amount of air routed through the particulate filter 49 in response to air quality determined from the air quality sensors 40, 50 to remove or reduce the amount of particulates in the circulating air. In one example, the particulate filter 49 is a HEPA filter that is operative to remove particulates from the circulating air.

In one example, ECS 10 further includes a particulate filter 49. Particulate filter 49 can be combined with the sorbent material 44, 44a or sorbent bank 48a, 48b, or the particulate filter 49 can be physically separated from sorbent material 44, 44a or sorbent bank 48a, 48b. In certain situations, temperatures for regeneration of the sorbent material 44 of sorbent regeneration device 100 are greater than the normal operating temperatures for the particulate filter 49. Thus, in one example the particulate filter 49 is thermally isolated from the sorbent material 44 in sorbent regeneration device 100 or external and operably coupled to sorbent regeneration device 100 so as to avoid exposure to elevated temperatures introduced to regenerate sorbent material 44, for example, trim air provided by an engine during operation of aerospace vehicle 12.

In one example, ECS 10 or sorbent regeneration device 100 further includes a VOC/ozone converter 22 that is further operative to remove or reduce the amount of volatile organic compounds (VOC) from the air. The controller 30 is operative to control an amount of air routed through the VOC/ozone converter in response to the air quality sensors 18, 24, 40, 50.

In one example, ECS 10 or sorbent regeneration device 100 can further include a CO2 removal device 68. The controller 30 is operative to control an amount of air routed through the CO2 removal device in response to air quality determined from the air quality sensors 18, 24, 40, 50 to remove or reduce the amount of CO2 in the circulating air. In one example, the CO2 removal device 68 is a VOC/CO2 removal device that is further configured to remove or reduce the amount of volatile organic compounds (VOC) and CO2 from the circulating air.

Thus, the ECS 10 can include a CO2 removal device 68 having at least one carbon dioxide sorbent material that is regenerable, in order to provide ongoing sorption/regeneration or desorption of carbon dioxide (i.e. multiple sorption and desorption cycles). In one example the CO2 removal device 68 includes an assembly housing a regenerable carbon dioxide sorbent material (e.g., a removable/replaceable canister or desiccant assembly) and a conduit with bypass valve 47 arranged to allow cabin air flow air over the regenerable carbon dioxide sorbent material of the CO2 removal device 68 and return the treated air to the interior volume 14 of the passenger cabin, and a conduit with bypass valve 47a arranged to allow hot air 56 to flow over the regenerable carbon dioxide sorbent material to desorb carbon dioxide from the sorbent material. Additionally, the sorbent material can be exposed to a pressure below atmospheric pressure together with hot air 56 to encourage desorption and to expel the desorbed carbon dioxide via waste gas outflow/vacuum 54.

The regenerable carbon dioxide sorbent materials are capable of sorbing carbon dioxide at temperatures of that of a cabin of an aerospace vehicle during operation. In one example, the regenerable carbon dioxide sorbent materials is capable of adsorbing carbon dioxide at temperatures between −10° C. to 40° C.

In one example, the sorbent material of the CO2 removal device 68 is arranged therein to provide a pressure drop of 100 mbar or less, 70 mbar or less, or 50 mbar or less, 25 mbar or less, 10 mbar or less. In one example, the pressure drop, will be between 1 mbar to 5 mbar. The regenerable carbon dioxide sorbent material of the CO2 removal device 68 is generally capable of sorbing carbon dioxide at temperatures within a sorption temperature range that corresponds to a range of cabin environments of an aerospace vehicle during operation.

Desorption of carbon dioxide (regeneration) from regenerable carbon dioxide sorbent materials of the CO2 removal device 68 occur above a certain temperature (i.e., the regeneration temperature). The regeneration temperature of the regenerable carbon dioxide sorbent materials of the CO2 removal device 68 useful in the present disclosure include the range of 122° F. (50° C.) to 248° F. (120° C.), depending on the hot air 56 temperature and the vacuum pressure 54 the carbon dioxide sorption material is exposed to during regeneration under the operation conditions of the ECS 10.

Carbon dioxide sorbent materials of the CO2 removal device 68 can be amine-based sorption materials, zeolites, and/or MOFs (metal-organic frameworks). Amine-based sorption materials include a chemical compound comprising an amine functional group. The chemical compound can be immobilized (e.g. covalently) on a solid support. In one example, the amine is a primary amine or a secondary amine. In another example, the amine is a primary amine. For example, the amine-sorbent of the CO2 removal device 68 can be a benzyl amine functional group, or an alkyl amine functional group, such as a 3-aminopropyl functional group.

In one example, the carbon dioxide sorbent material of the CO2 removal device 68 is bound to a solid support. The nature of the solid support is not limited. The solid support may be a polymeric solid support. The solid support may be an inorganic solid support. In one example, the amine functional group-containing chemical compound is covalently attached to the backbone of the polymer of a polymeric solid support or to at least a surface of the inorganic solid support. Suitable polymeric supports include high temperature polymer solid supports, fiber-reinforced solid supports. One example, the polymeric support is porous. In another example, the solid support is the carbon dioxide sorbent material, e.g., silica solid supports, and zeolite solid supports. In one example, the carbon dioxide sorbent material is an inorganic solid support that is porous, e.g., porous silica solid supports, zeolites, and MOFs.

In one example, the ECS 10 can further include an humidifier 62 and one or more humidity sensors (not shown), and the controller 30 is operative to control one or more of the external air supply device 16, recirculation device 52, humidifier 62 and sorbent regeneration device 100 in response to relative humidity determined from the humidity sensors. In one example, outside air and recirculated air, when mixed, provide humidity regulation and/or control of the cabin air. A contributing factor to humidity of cabin air in an aircraft is exhaled air from passengers and crew. As outside air at cruising altitude is dry (~0% RH), mixing a larger proportion of recirculated air with outside air results in an increase in humidity of the cabin air under such conditions.

Thus, the ECS 10 can include fans of variable speed that can provide more external or recirculated airflow by increasing the fan speed or provide for less airflow by decreasing fan speed. In some situations where external airflow from the engine is supplied to the cabin, fan speed can be adjusted to draw more/less airflow from the engine. Higher humidity together with contaminant and particulate control, provides a comfortable cabin environment for airplane passengers and crew. Thus, the ECS 10 is configured to monitor air quality parameters, such as humidity, contaminants, and particulates, and control the external air supply device 16 and recirculation device 52 to provide a mix of externally supplied air and recirculated air in the interior volume 14 of the vehicle.

Implementation of the above methods may include one or more of the following features. In one example, monitoring air quality is provided by the controller 30 by obtaining signals from one or more air quality sensors 40, 50 disposed upstream and downstream (or on opposing or opposite sides) of the sorbent material 44 or sorbent bank 48a, or particulate filter 49 within the ECS 10 or the sorbent regeneration device 100. The controller 30 compares one or more air quality sensor signals of air quality sensors 40, 50 and determines an air quality value which is then compared to a predetermined calibration or threshold value. Based on such comparison, the controller 30 can initiate regenerating the sorbent material 44, for example, by controlling one or more bypass valves 42, 46, 46a and 46b to route hot air 56, e.g., trim air, at a temperature and for a time through the sorbent material 44 capable of removing at least a portion of the contaminants from the sorbent material 44. In another example, controller 30 can initiate regenerating the sorbent material 44, for example, by controlling one or more bypass valves 42, 46, 46a and 46b to route hot air 56 and vacuum pressure 54, at a temperature and for a time through the sorbent material 44 capable of removing at least a portion of the contaminants from the sorbent material 44. Regeneration of sorbent material 44 can continue for a time until the signals received from the air quality sensor 40, 50 by the controller 30 meet certain predetermined calibrations or threshold conditions.

In another example, the ECS 10 or the sorbent regeneration device 100 includes at least two sorbents 44, 44a of the same or different sorbent material that can be regenerated. In one example, regenerating the sorbent material 44 further comprises using signals provided by the controller 30 to bypassing the second sorbent bank 48b containing sorbent material 44a with hot air 56 when regenerating a first sorbent bank 48a containing sorbent material 44.

In another example, regenerating the sorbent material 44 or 44a is performed by applying air of at least 150° F. (66° C.) to the sorbent material 44 or 44a. In another example, applying air of at least 150° F. (66° C.) to the sorbent material 44 or 44a is carried out by directing trim air from a jet engine to the sorbent material 44. In one example, air at a temperature at or above 150° F. (66° C.), at or above 160° F. (71° C.), at or above 170° F. (77° C.), at or above 180° F. (82° C.), at or above 190° F. (88° C.), at or above 200° F. (93° C.), at or above 210° F. (99° C.), at or above 220° F. (104° C.), at or above 230° F. (110° C.), at or above 240° F. (116° C.), at or above 250° F. (121° C.), at or above 260° F. (127° C.), at or above 270° F. (132° C.), at or above 280° F. (138° C.), at or above 290° F. (143° C.), at or above 300° F. (149° C.), at or above 310° F. (154° C.), at or above 320° F. (160° C.), at or above 330° F. (166° C.), at or above 340° F. (171° C.), or at or above 350° F. (177° C.) is used.

Sorbent material 44 can be completely regenerated or partial regenerated using the systems and methods disclosed herein. For example, regenerating (e.g., removing contaminants contained in or absorbed on the sorbent material 44 or absorbent material of sorbent material 44) can result in removal of less than 100% of the total amount (by weight) of contaminate, providing an extension of the replacement interval for the filter. In one example, less than 90%, less than 80%, less than 70%, less than 60%, less than 50%, less than 40%, less than 30%, or less than 20%, of the total amount of contaminants contained in or absorbed on the sorbent material 44 (as determined by weight) are removed using the regeneration method disclosed herein at least once.

In one example, sorbent material 44 can be restored to full or near-full effectiveness, extending the life the gas contaminant sorbent material without requiring regular changes or the interval of such changes. In one example, sorbent material 44 can be regenerated with heat, vacuum, or both. The present disclosure advantageously uses on board or in flight generated hot air to facilitate in-flight regeneration of the sorbent material 44.

Figure 1:
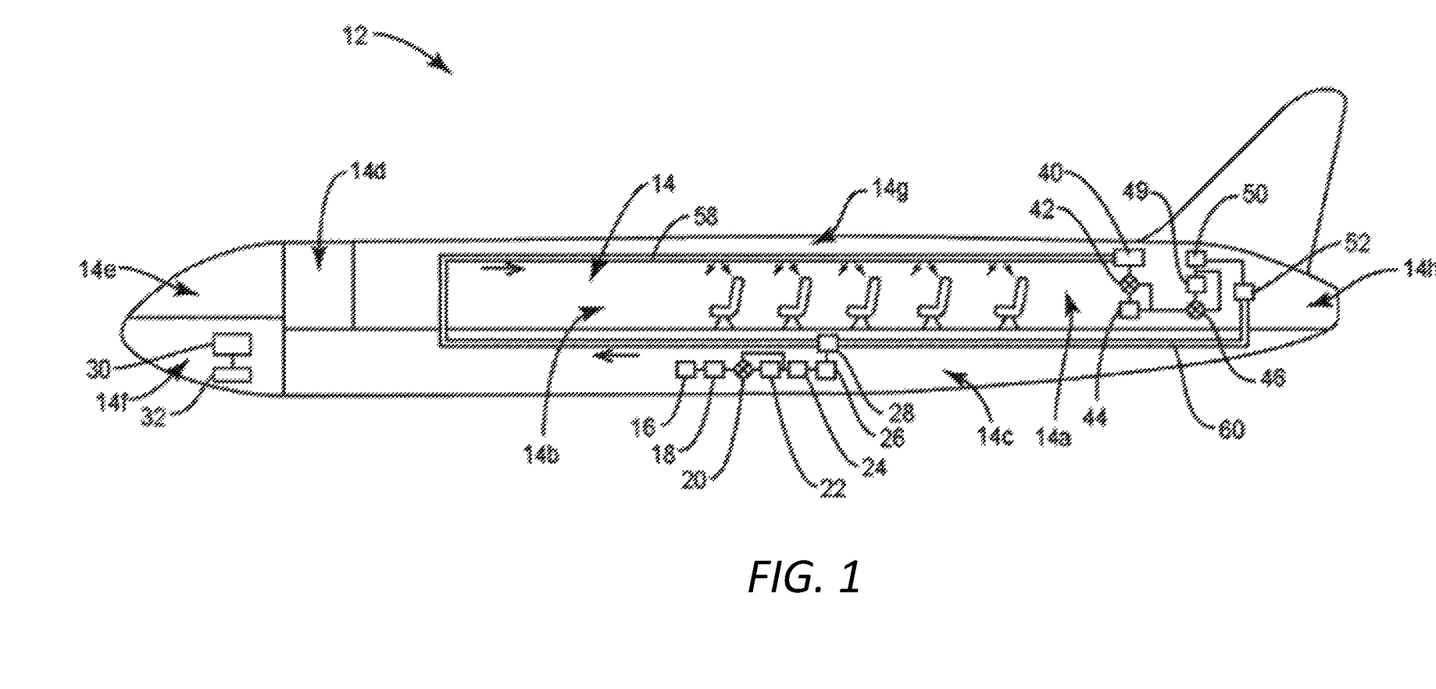
FIG. 1 is a section view of an aerospace vehicle, for example, a passenger aircraft.

FIG. 1 depicts a section view of ECS 10, adapted to an aerospace vehicle 12, which in the example is depicted as passenger aircraft. Other types of aircraft are envisioned. The aerospace vehicle 12 is depicted as having an interior volume 14, includes first interior volume portion 14a, second interior volume portion 14b, a cargo compartment 14c, a special use area 14d (e.g., a galley or lavatory), a flight deck area or cockpit 14e, an electronics bay 14f, overhead bins 14g, an aft tail cone area 14h, and the like. Alternate arrangements of these aforementioned compartments/areas of the aerospace vehicle 12 are envisioned. FIG. 1 depicts a right side section view of ECS 10, of which some or all of the components shown can be duplicated on the left side of the aerospace vehicle 12.

In one example, in the disclosed ECS 10, each of these areas or portions of the interior volume 14 of the aerospace vehicle 12 can be designated to have different requirements or the same requirements as to gas contaminant levels. In other aerospace vehicle systems, e.g., cargo or military aircraft, or spacecraft, the interior volume 14 can be divided differently, and different areas can have different requirements for gas contaminant levels.

Various aspects of the present disclosure are described herein within the context of sorbents configured for managing the gas contaminant levels of the interior volume 14 for passenger comfort. In one example, the sorbent material 44 is configured as a gas contaminant filter or contained in a canister to absorb or otherwise contain one or more substances present in the interior volume 14 of the aircraft 12 as an amount of interior volume 14 is passed there through. In another example, the sorbent material 44 is configured as a gas contaminant filter or contained in a canister that is regenerated during flight operation of the aerospace vehicle 12. Thus, various aspects of the present disclosure are described herein within the context of sorbent material 44 configured for removing gas contaminants from the interior volume 14 for passenger comfort and for regeneration of sorbent material 44 during flight operation. The teachings of the present disclosure can be adapted to the regeneration of sorbent material 44 in-flight for different aerospace vehicle systems for different deployments.

The present system and device are configured to be adaptable to or integrated with an ECS. For example, ECS 10 and sorbent regeneration device 100 can be retrofitted in or with an Environmental Control System that monitors air quantity and temperature. ECS 10 and sorbent regeneration device 100 are also configured to be adaptable to an Environmental Control System that uses one or more ultraviolet (UV) light sources for regeneration of an active filter using a photo catalytic oxidation (PCO) bed to sorb contaminant gases from the air.

In one example, the present disclosure includes only sorbent-based materials that can be regenerated and is exclusive of a PCO sorbent bank and an intense UV light source to activate a catalyst (which breaks down the contaminants into other compounds), but rather, uses thermal energy and/or a vacuum to remove the contaminants and to discharge the contaminants without chemical change to the contaminants exterior to the aerospace vehicle 12.

In one example, ECS 10 and sorbent regeneration device 100 are used with another Environmental Control System, where a common controller independently controls the other Environmental Control System and ECS 10 and sorbent regeneration device 100. ECS 10 and sorbent regeneration device 100 can be operated independent of the other Environmental Control System using controller 30. In another example, ECS 10 and sorbent regeneration device 100 are used in with another Environmental Control System and separate and independent controllers are used.

Figure 2A:
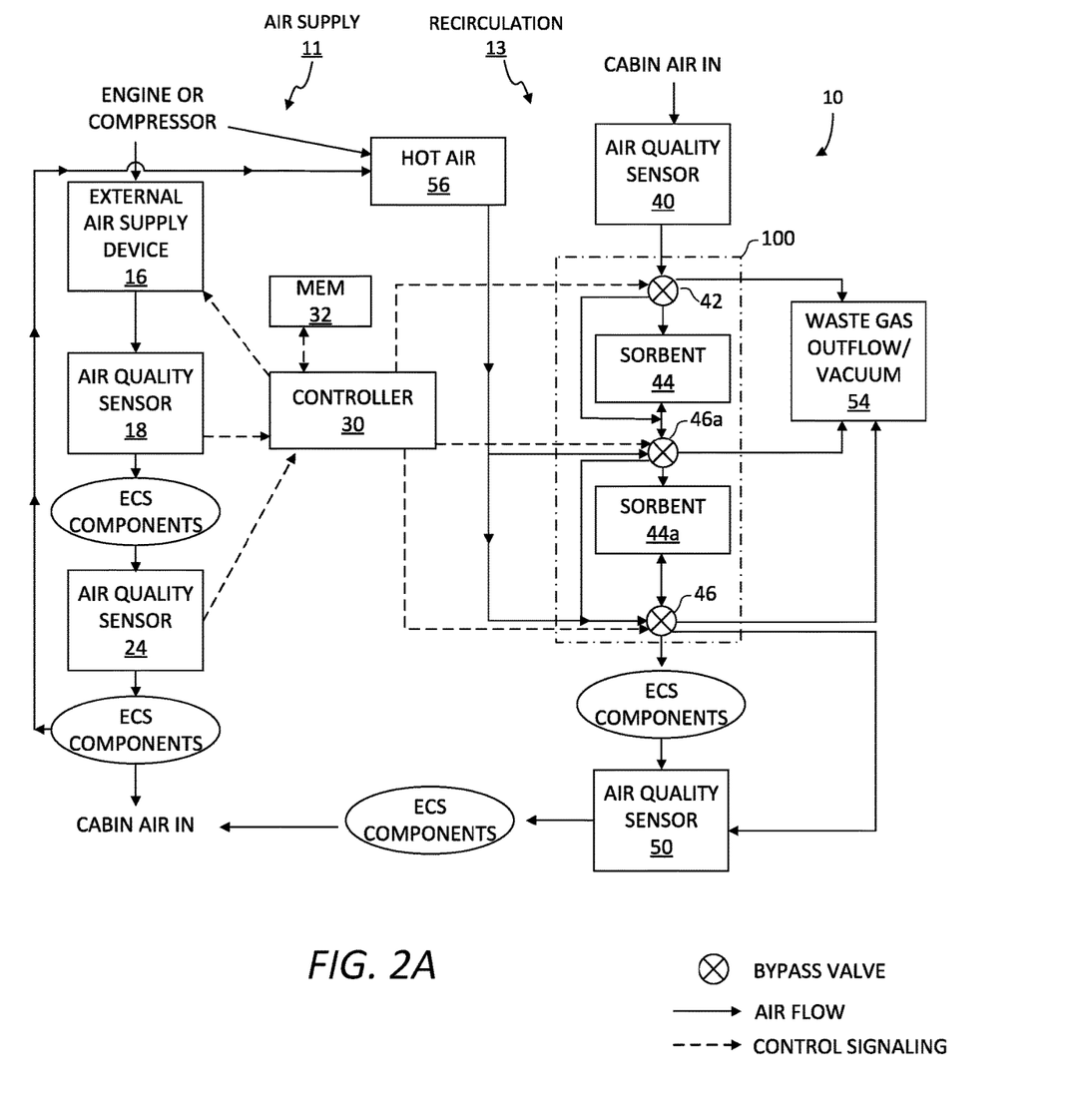
FIG. 2A is a block diagram of an exemplary aerospace vehicle Environmental Control System (ECS) with sorbent regeneration.

As shown in FIG. 2A, an air handling circuit, having an air supply path 11 and recirculation airflow path 13, is configured to detect one or more contaminants in the interior volume 14 of the cabin air of aerospace vehicle 12. Detection is provided by one or more of air quality sensors 18, 24, 40, 50 of ECS 10. Regeneration of one or more sorbents 44, 44a incorporated in sorbent regeneration device 100 of ECS 10 is provided, where sorbent regeneration device 100 is configured to receive hot air 56 and/or waste gas outflow/vacuum 54. Controller 30 is operatively connected to memory 32, and controls bypass valves 42 and 46 in recirculation airflow path 13 of an air handling circuit as well as other ECS components during regeneration and non-regeneration operation, as discussed below.

FIG. 2A shows an exemplary air supply path 11 and recirculation airflow path 13 airflow circuit of ECS 10, where air supply path 11 and recirculation airflow path 13 meet at mix manifold 28. The air supply path 11 and recirculation airflow path 13 airflow circuits of ECS 10 can be duplicated, for example, on opposite sides (left/right) of the aerospace vehicle 12.

Figure 2B:
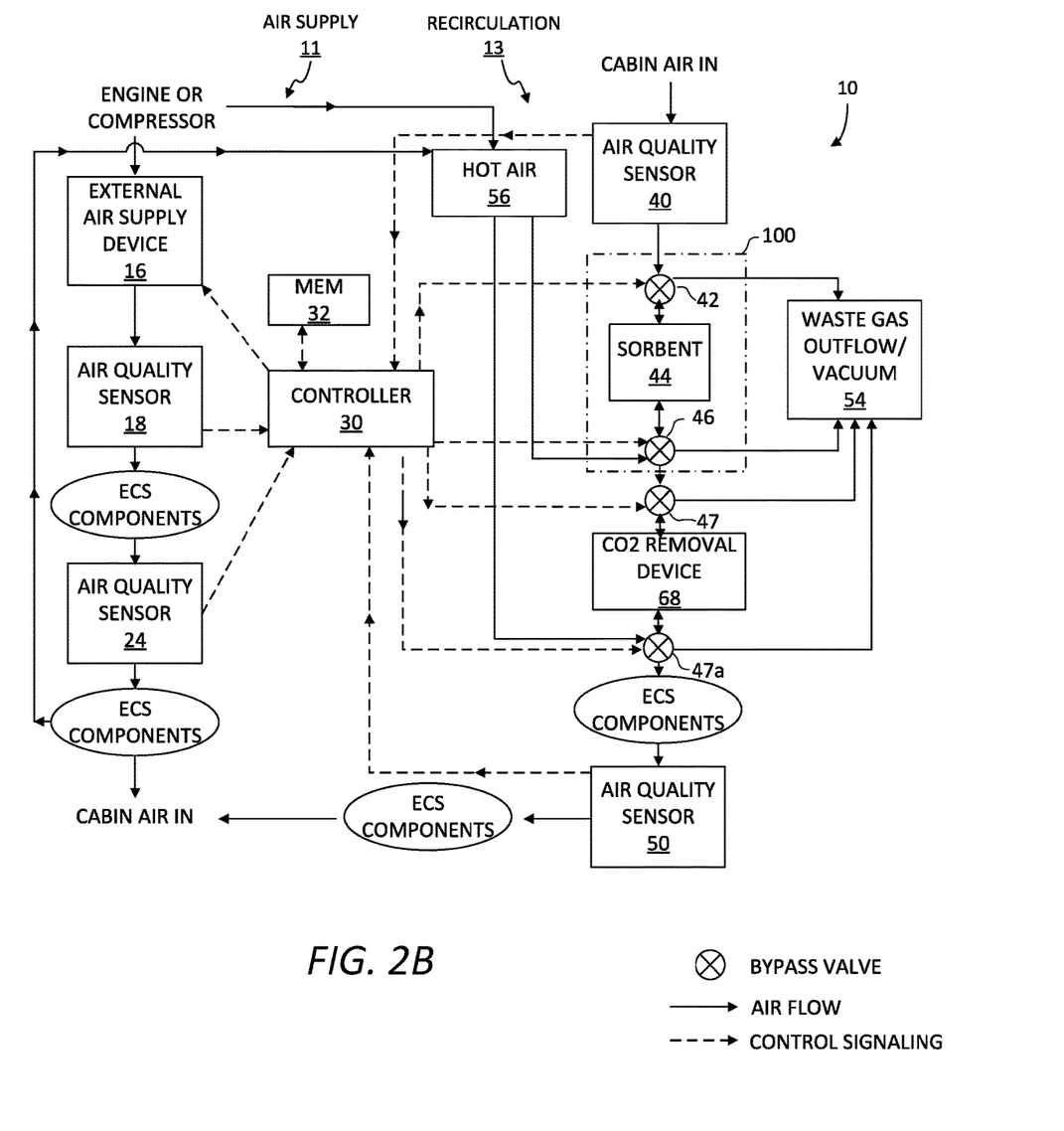
FIG. 2B is a block diagram of an exemplary aerospace vehicle Environmental Control System (ECS) with sorbent regeneration and CO2 sorbent material regeneration.

Likewise, as shown in FIG. 2B, in addition to sorbent regeneration device 100, CO2 in the interior volume 14 of the cabin air of aerospace vehicle 12 is detected by one or more of air quality sensors 18, 24, 40, 50 of ECS 10, and a method for regenerating one or more CO2 sorbent materials incorporated in CO2 removal device 68 of ECS 10 is provided. CO2 removal device 68 is configured to receive hot air 56 and/or waste gas outflow/vacuum 54 during regeneration. Controller 30 controls bypass valves 47 and 47a in recirculation airflow path 13 of an air handling circuit as well as other ECS components during regeneration and non-regeneration operation, as discussed below.

Figure 2C:
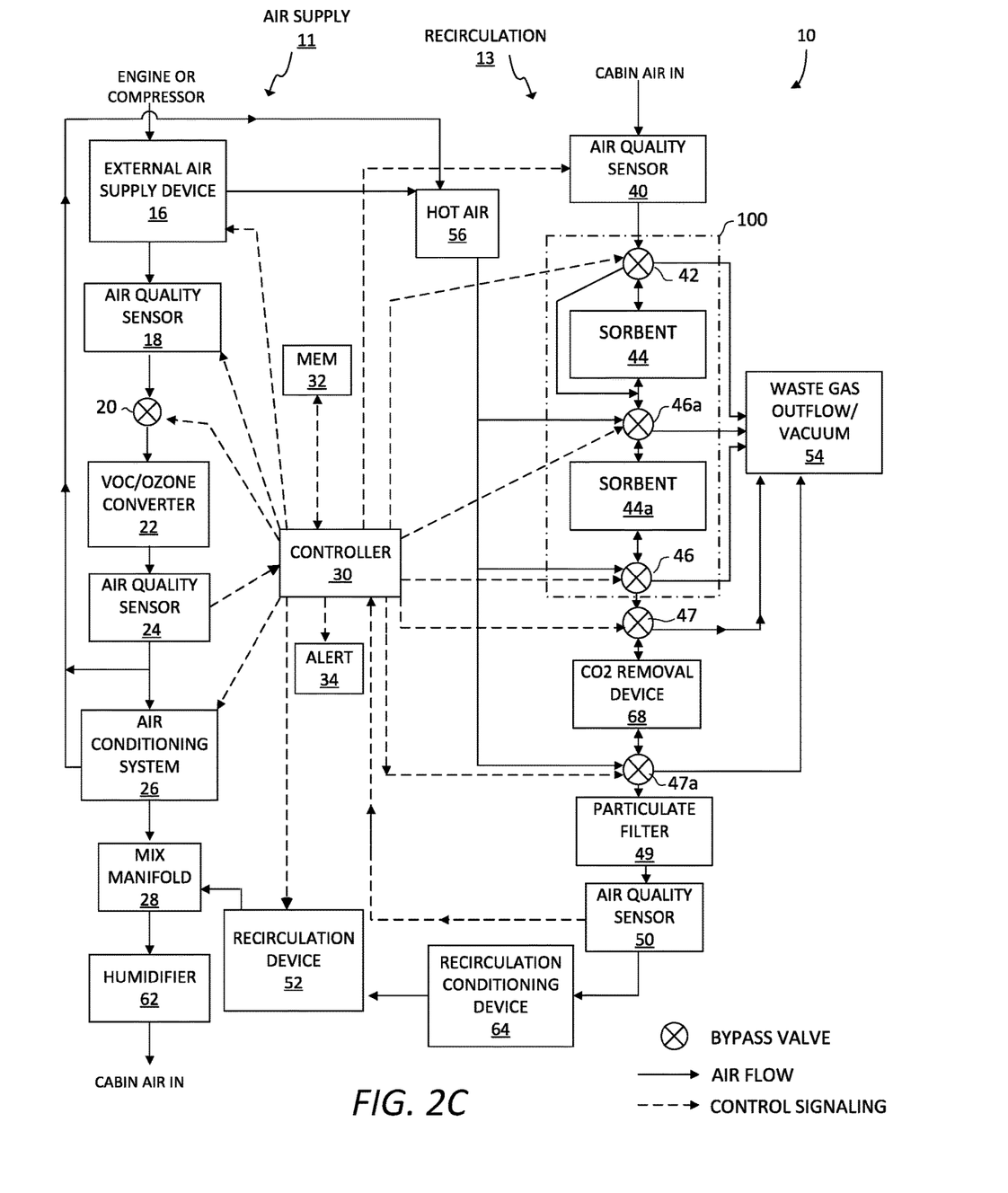
FIG. 2C is another block diagram of an exemplary aerospace vehicle Environmental Control System (ECS) with sorbent regeneration and CO2 sorbent material regeneration.

In the further detailed example depicted in FIG. 2C, the air supply path 11 includes an external air supply device 16, an upstream air quality sensor 18, a bypass valve 20, a downstream air quality sensor 24, an air conditioning system 26, humidifier 62, and a mix manifold 28. The air handling circuit of FIG. 2C also includes an external air supply device 16 operative to selectively intake exterior air from outside of the aerospace vehicle 12, such as from an engine or compressor. The controller 30 controls the external air supply device 16 to input none, or a specified amount of external air to air supply path 11, e.g., as measured by volumetric flow rate or mass flow rate meter or sensor.

Accordingly, as shown in FIG. 2C, the recirculation airflow path 13 of ECS 10 recirculates air. To maintain the quality of recirculated air, the controller 30 directs some or all of the air through sorbent material 44. After passing through sorbent material 44, the filtered, recirculated air is then mixed with conditioned external air from the air supply path 11 and distributed throughout the interior volume 14 of the aerospace vehicle 12.

The upstream air quality sensor 18 monitors the external air, and can measure and signal the controller 30 parameters that quantify or quantitate VOC, particulates and/or contaminant levels or relative concentrations thereof. Based on the parameters sensed and sent by the upstream air quality sensor 18 to the controller 30, the controller 30 can, for example, calculate the air quality value, perform comparisons with stored information or threshold values, and send control signals to the bypass valve 20 to divert none, some, or all of the airflow through a downstream component, such as an VOC/ozone converter 22, as shown in FIG. 2C. Thus, in one example, the controller 30 is operative to direct some or all of the external air through the VOC/ozone converter 22 when the aerospace vehicle 12 is on the ground, as this capability allows for management of air quality and concomitant passenger and crew comfort, during extended ground periods, such as when the aerospace vehicle 12 is held at a gate or taxiway due to congestion or weather.

Operation of the VOC/ozone converter 22 is monitored by the controller 30, e.g., by comparing the level of VOC or ozone in the air as determined by comparing signals sent by the upstream air quality sensor 18 and a downstream air quality sensor 24 and received by the controller 30 for comparison. By monitoring the upstream air quality sensor 18 and the downstream air quality sensor 24, the controller 30 can gauge VOC/ozone converter 22 operational effectiveness, for example, to determine when to change a catalyst present in the VOC/ozone converter 22. In one aspect, the controller 30 determines an amount of external air to direct to the VOC/ozone converter 22 (by sending controlling signals to the bypass valve 20), by comparison of the upstream and downstream air quality sensor 18, 24 outputs received by the controller 30.

The outside air can then be conditioned by the air conditioning system 26 to pressurize, heat, or cool the outside air as appropriate for human comfort. In one example, the air conditioning system 26 is a Cabin Air Conditioning and Temperature Control System (CACTCS).

Again referring to the recirculation airflow path 13 of ECS 10, as depicted on the right side of FIG. 2C, for example, cabin air from the first interior volume portion 14a is directed through or over an upstream air quality sensor 40. The upstream air quality sensor 40 can have the ability to detect the level or concentration of known contaminants. Based on the contaminant level detected and signaled by the upstream air quality sensor 40, the controller 30 is operative to output one or more control signals that cause the bypass valve 42 to divert none, some, or all of hot air 56 through the sorbent material 44 of the sorbent regeneration device 100. The sorbent material 44 is operative to remove gaseous contaminants from the air.

Downstream air quality sensor 50 monitors air from the sorbent material 44 and transmits the sensed contaminant level to the controller 30. By comparing contaminant levels indicated by the upstream and downstream air quality sensors 40, 50, the controller 30 can monitor the operation of the sorbent material 44 and adjust one or both of the bypass valves 42, 46, 46a and 46b to control the hot air 56 or vacuum pressure 54 to achieve desired levels of contaminants in the recirculated air. As further discussed herein, the comparison can also indicate a condition for regeneration of sorbents 44, 44a. For example, if some or all of the airflow directed through downstream air quality sensor 50 is not sensed at a sufficiently lower level of contaminant than the upstream air quality sensor 40 at a given time interval commensurate with the known or calculated airflow rate of the system, a regeneration condition may be satisfied causing the regeneration process for the sorbents 44, 44a to be initiated by the controller 30. The controller 30, based on the contaminant level detected and signaled by the upstream air quality sensor 40, compared to the contaminant level detected and signaled by the downstream air quality sensor 50, can initiate a regeneration process for one or both of sorbents 44, 44.

Based on, e.g., a comparison of the air quality sensed by upstream and downstream air quality sensors 40, 50, the controller 30 can determine that one or both of the sorbents 44 and 44a are to be regenerated. When two (or more) sorbent banks 48a, 48b, of filter/sorbent material are provided, the entire airflow can be selectively directed through or over first sorbent bank 48a housing sorbent material 44 of sorbent material. Controller 30 can divert airflow to second sorbent bank 48b housing sorbent material 44a of sorbent material—that is, the one not being regenerated—so as to continue to "scrub" the air. Regeneration of sorbents 44, 44a can be carried out selectively utilizing bypass valves 46, 46a, 46b to divert none, some, or all of the hot air 56 alone, or in combination with vacuum pressure 54, through the sorbents 44, 44a in combination with signals obtained from air quality sensors 40, 50 that are analyzed by the controller 30. Thus, at least one regenerative contaminant air filter can remain operational while regeneration of another filter takes place.

The controller 30 can direct hot air 56 to supply high-temperature air to either or both of the sorbent material 44, 44a for heat-based regeneration. In one example, the hot air 56 is "trim air", which is high-temperature air from one or more air supply sources. The hot air 56 can be complimented with a heater. The hot air 56 from the hot air source can be cooled using heat dissipating elements after exiting the sorbents 44, 44a. Hot air 56 from a hot air source is provided, for example, from trim air from the engine and supplied to the air supply path 11, e.g., after passing thru VOC/ozone converter 22, as shown in FIG. 2.

The controller 30 can control a vacuum pressure 54 to supply negative delta pressure air to the sorbent material 44 for vacuum-assisted thermal regeneration by manipulating one or more of bypass valves 42, 46, 46a and 46b.

During regeneration, the controller 30 can control one or both of the sorbents 44, 44a, as well as valves in a gas transport manifold or piping, to discharge waste gas to the exterior of the aerospace vehicle 12 via the waste gas outflow/vacuum 54. Discharging waste gas to the waste gas outflow removes the at least a portion of waste gas containing contaminants desorbed from the filter/sorbent material, which can allow for the removal of more contaminants from recirculated air without the necessity of on-ground maintenance.

The recirculation airflow path 13 of the ECS 10 can also include an optional particulate filter 49 configured to remove particulates. In one example, particulate filter 49 is integral with or combined with sorbent material 44. In another example, particulate filter 49 is physically separated from sorbent regeneration device 100. Particulate filter 49 can be configured to receive air after passing through sorbent material 44, or air that is bypassed around the sorbent material 44 by controller 30. In one example, air exiting the sorbent material 44 can be cooled prior to introduction to the particulate filter 49 so as to avoid exceeding the maximum operating temperature of the particulate filter 49. Particulate filter 49 can be configured to be thermally isolated from the hot air 56 from hot air source passed through the particulate filter 49.

In one example, the particulate filter 49 is a high efficiency particulate air (HEPA) filter or high efficiency filter with nano-material fibers (HENF). The particulate filter 49 is shown downstream of sorbent material 44 or sorbent material 44a, but can be configured upstream.

Air exiting the sorbents 44 or 44a is sensed by a downstream air quality sensor 50, providing a signal to the controller 30 providing quantification of the level of contaminants and, if optional particulate filter 49 is used, a quantification of particulates to the controller 30. Air flow from either the sorbent regeneration device 100, CO2 removal device 68 or particulate filter 49 can be passed through a recirculation conditioning device 64, as shown in FIG. 2C. The conditioned air from the recirculation conditioning device 64 sent to recirculation device 52 and then mixed with recirculated air in a mix manifold 28, and distributed to the cabin of aerospace vehicle 12, e.g., to the second interior volume portion 14b, the special use area 14d, and the cockpit 14e. Recirculation device 52, which includes a fan or other air moving device, is further operative to move recirculated air from, e.g., a first interior volume portion 14a to, e.g., a second interior volume portion 14b. The controller 30 can control the recirculation device 52 to alter the recirculated airflow rate, such as by controlling the voltage of a recirculation fan. Recirculated air then flows into the mix manifold 28 and is mixed with any outside air flowing from the air supply airflow path. The combined air is then distributed throughout the relevant spaces in the interior volume 14, such as into an air passage 58, from which air is supplied to the passenger seating areas.

The controller 30 monitors air quality in both the air supply path 11 and recirculation airflow path 13 by receiving signals from air quality sensors 18, 24, 40, 50. While the primary purpose and use of this information is to control bypass valves 20, 42, 46, 46a and 46b and other system components, the controller 30 is also operative to sound an alarm, or otherwise alert a flight crew, if the air quality falls outside of predetermined or programmable bounds and/or to indicate an operational anomaly in one or more components 16-28, 40-56 and 62. The controller 30 can send appropriate signals to an alert device 34, which can comprise a visible or audible alarm, or can comprise an interface into, e.g., an aircraft maintenance computer having a human interface.

In one example of compensation for an anomaly, ECS 10, using signals from one or more of air quality sensors 18, 24, 40, and 50 detects a higher level of gaseous contaminants present in a left side of air supply path 11, and in response, controller 30 closes bypass valve 20 for the left external air supply device 16 isolating the left side of air supply path 11 and prevent airflow from reaching the cabin. To compensate total airflow volume being provided to the cabin from the left external air supply device 16, additional airflow can be provided from a right air supply device 16. In addition, recirculation device 52 can be controlled by controller 30 to provide a higher airflow, drawing through sorbent regeneration device 100 providing an additional volume of purified airflow. The additional airflow from the right air supply 16 and recirculation device 52 makes up the airflow that is not being supplied from the left air supply 16 having an anomaly.

In one example, the ECS 10 further includes an alert device 34 having a human interface. The controller 30 is operative to detect an anomaly of one or more of the external air supply device 16, the recirculation device 52, sorbent regeneration device 100, and components such as the VOC/ozone converter 22 or CO2 removal device 68, air quality sensors 18, 24, 40, 50, bypass valves 42, 46, 46a and 46b. The ECS 10 is configured to output a signal as an indication of the anomaly to the alert device 34 for alerting a person, e.g., flight crew. Anomalies can include, but not limited to, short-circuit, loss of current, and/or mechanical malfunction events of one or more of the external air supply device 16, the recirculation device 52, sorbent regeneration device 100, and components such as the VOC/ozone converter 22 or CO2 removal device 68, air quality sensors 18, 24, 40, 50, bypass valves 42, 46, 46a and 46b. Implementation of the described alert method may include hardware, methods or processes, or computer software on a computer-accessible medium configured to perform the actions of the alert method.

In one example, the controller 30 is further operative to isolate the external air supply device 16, VOC/ozone converter 22, recirculation device 52, sorbent material 44, 44a, or CO2 removal device 68 that has an anomaly condition by controlling bypass valves 20, 42, 46, 46a, and 46b. The controller 30 is further operative to control the external air supply device 16, recirculation device 52, sorbent material 44, 44a, or VOC/ozone converter 22 and/or CO2 removal device 68 to compensate for the system component with the anomaly and maintain air quality. For example, the controller 30 can increase, decrease or stop airflow from the external air supply device 16, recirculation device 52, or bypass the component with the anomaly by opening and/or closing bypass valves 20, 42, 46, 46a, and 46b. The present system and methods controls airflow, and directs airflow to specific areas of the aerospace vehicle 12 if needed.

Figure 3A:
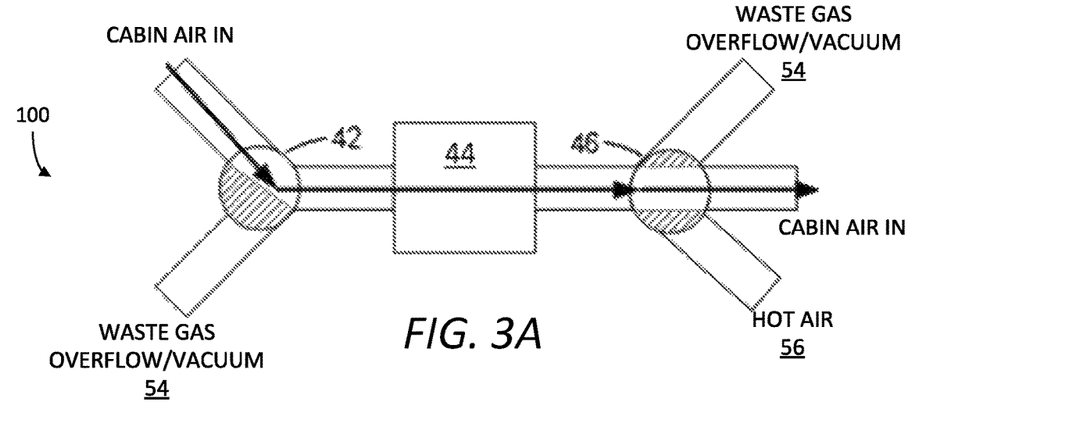
FIGS. 3A, 3B, and 3C are schematics of ECS states showing air flow directions through a regenerative sorbent material.
Figure 3B:
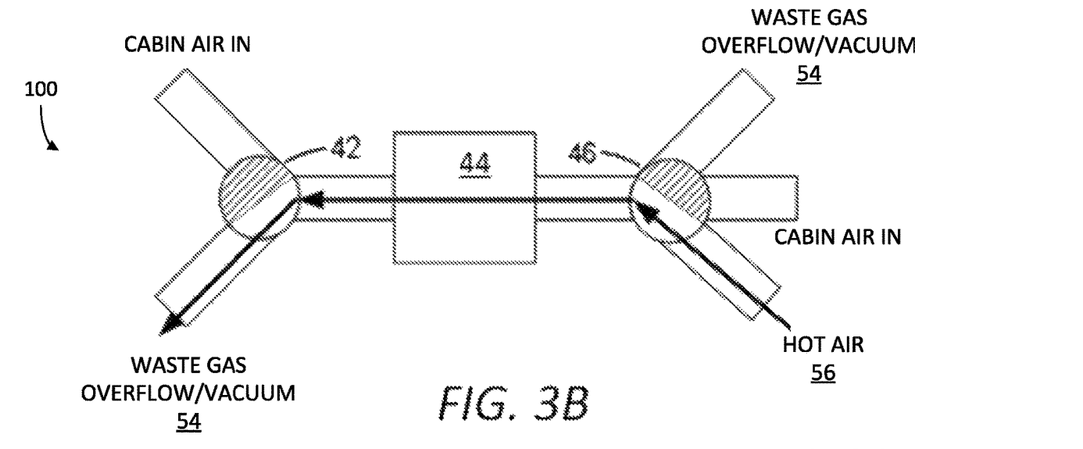
Figure 3C:
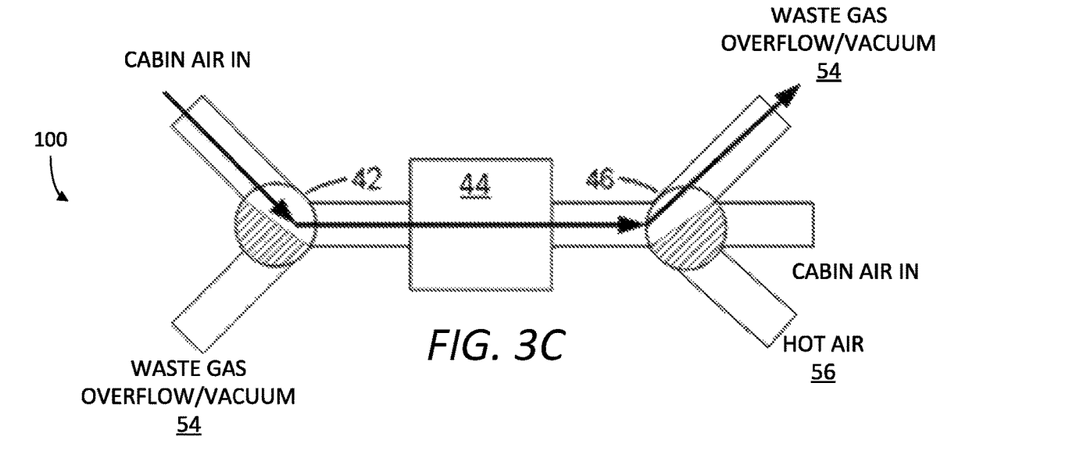

FIGS. 3A, 3B, and 3C show various "states" of operation of the presently disclosed sorbent regeneration device 100 and corresponding air flow direction through the sorbent material 44. Thus, FIG. 3A shows the presently disclosed sorbent regeneration device 100 of ECS 10 operating under normal conditions configured to accept the recirculated air via the sorbent material 44, remove contaminants, and direct such air to the cabin of the aerospace vehicle 12, controlled by bypass valve 42 so as to bypass outflow (outboard/waste/vacuum pathway) and direct air through sorbent material 44. Bypass valve 46, depicted as a three-way bypass valve, allows air to be drawn through the sorbent material 44 by recirculation device 52 and to the cabin, bypassing outflow and reducing or preventing inflow from the source of the hot air 56.

FIG. 3B shows the presently disclosed sorbent regeneration device 100 operating under "regeneration" conditions designed to remove absorbed or associated contaminants from sorbent material 44. Thus, hot air 56 is directed through the bypass valve 46, depicted as a three-way bypass valve that can control hot air supply to the cabin or the waste gas outflow/vacuum 54 of the aerospace vehicle 12. Hot air 56 is introduced to sorbent material 44 and then subsequently directed via bypass valve 42 outflow without introduction to recirculation device 52. FIG. 3B shows air flow, controlled by bypass valves 42, 46, in an opposite direction than that of FIG. 3A.

FIG. 3C shows the presently disclosed sorbent regeneration device 100 operating under a "break in" state, such as after regeneration or after replacement or first use of the sorbent material 44. Thus, recirculation device 52 directs airflow through bypass valve 42 and through sorbent material 44 whereas the bypass valve 46, depicted as a three-way bypass valve directs this airflow to the waste gas outflow/vacuum 54 and prevents this airflow from entering the cabin.

Figure 4A:
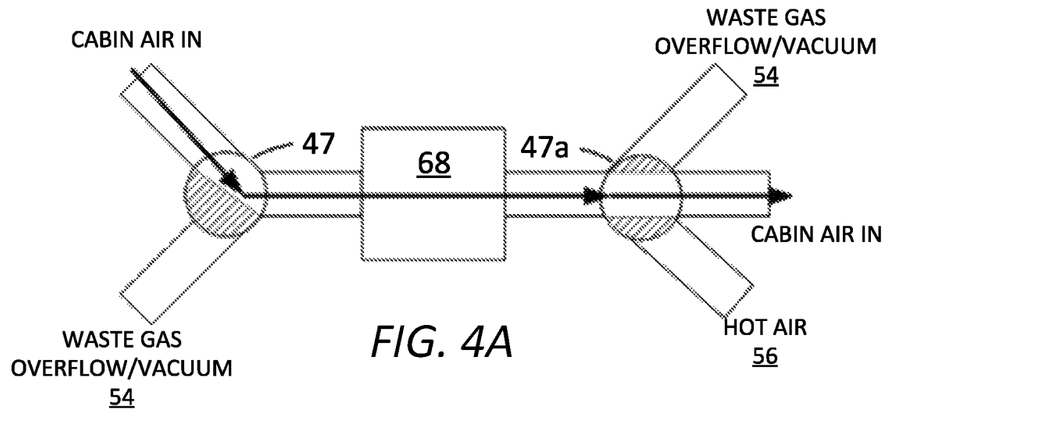
FIGS. 4A, 4B, and 4C are schematics of ECS states showing air flow directions through a regenerative CO2 sorbent material.
Figure 4B:
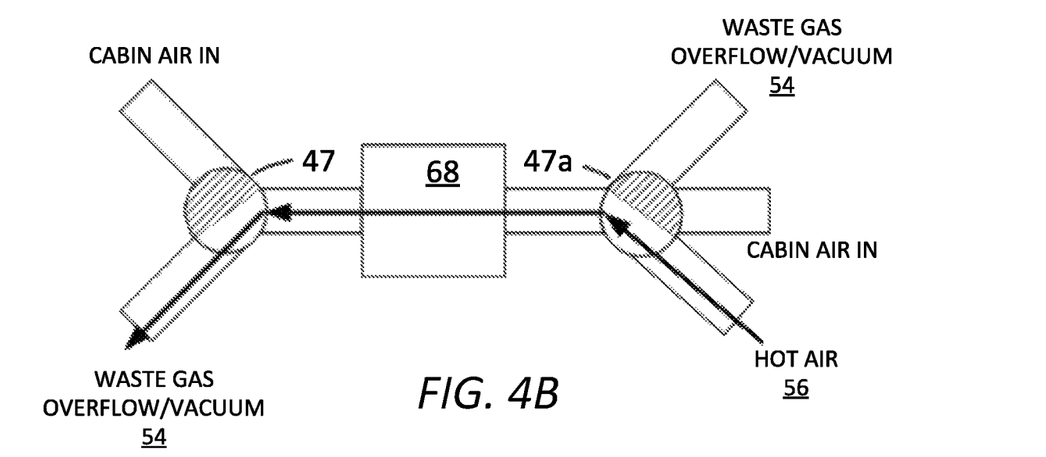
Figure 4C:
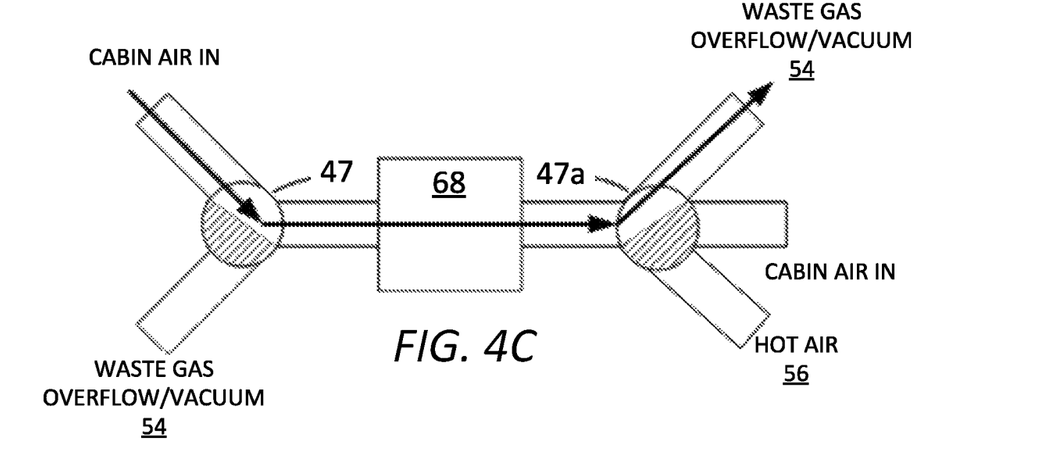

FIGS. 4A, 4B, and 4C show various "states" of operation of the presently disclosed CO2 removal device 68 and corresponding air flow direction through the CO2 removal device 68. Thus, FIG. 4A shows the presently disclosed CO2 removal device 68 of ECS 10 operating under normal conditions designed to accept the recirculated air via the CO2 removal device 68, remove contaminants, and direct such air to the cabin of the aerospace vehicle 12, controlled by bypass valve 47 so as to bypass outflow (outboard/waste/vacuum pathway) and direct air through CO2 removal device 68. Bypass valve 47a, depicted as a three-way bypass valve, allows air to be drawn through the CO2 sorbent material by recirculation device 52 and to the cabin, bypassing outflow and reducing or preventing inflow from the source of the hot air 56.

FIG. 4B shows the presently disclosed sorbent regeneration device 100 operating under "regeneration" conditions designed to remove absorbed or associated contaminants from CO2 removal device 68. Thus, hot air 56 is directed through the bypass valve 47a, depicted as a three-way bypass valve that can control hot air supply to the cabin or the waste gas outflow/vacuum of the aerospace vehicle 12. Hot air 56 is introduced to CO2 removal device 68 and then subsequently directed via bypass valve 47 outflow without introduction to recirculation device 52. FIG. 4B shows air flow controlled by bypass valves 47, 47a in an opposite direction than that of FIG. 4A.

FIG. 4C shows the presently disclosed sorbent regeneration device 100 operating under a "break in" state, such as after regeneration or after replacement or first use of the CO2 removal device 68. Thus, recirculation device 52 directs airflow through bypass valve 47 and through CO2 removal device 68 whereas the bypass valve 47a, depicted as a three-way bypass valve directs this airflow to the waste gas outflow/vacuum 54 and prevents this airflow from entering the cabin.

Figure 5:
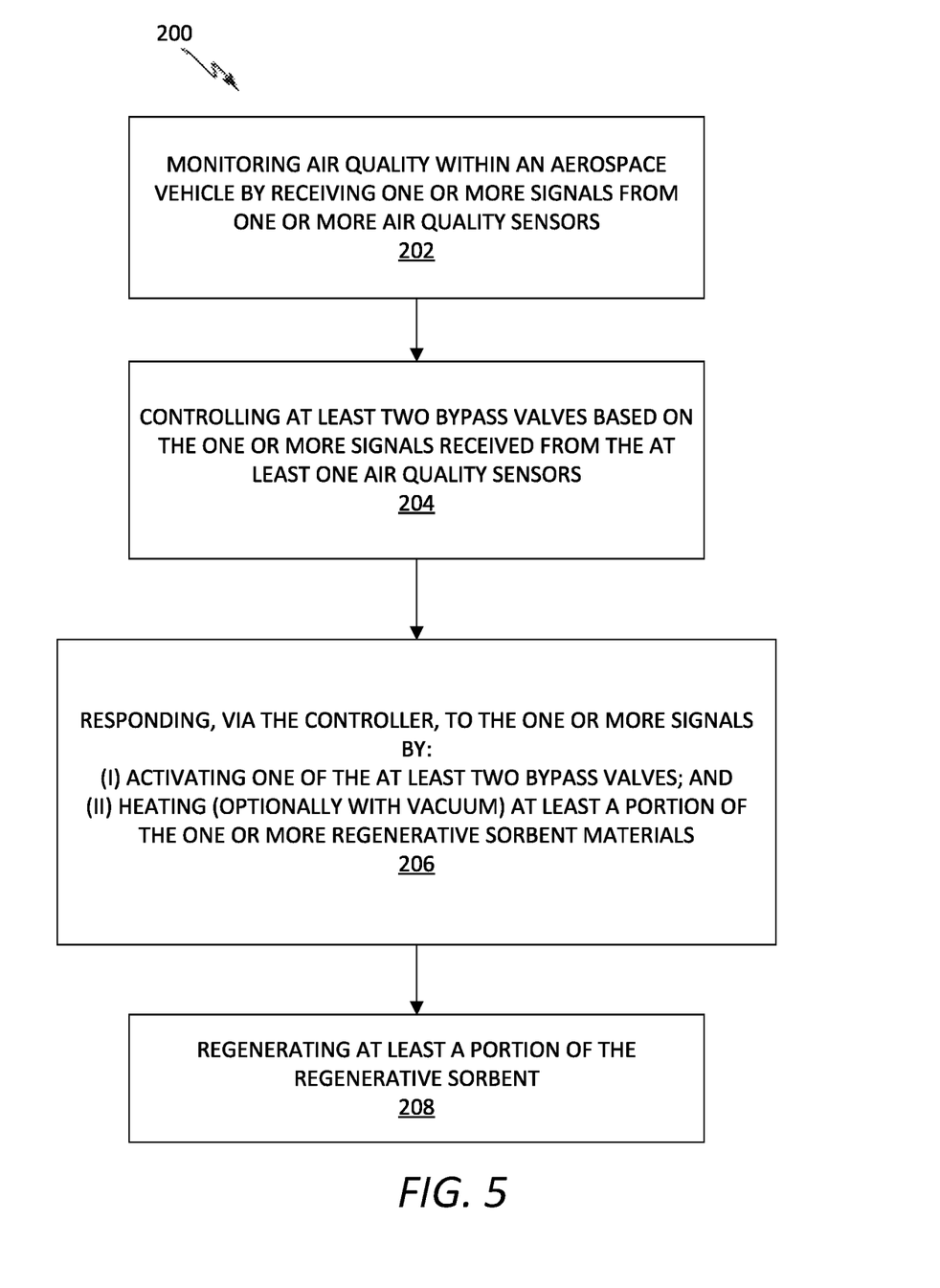
FIG. 5 is a flow diagram of an example method of regeneration of a regenerative sorbent material during operation of an aerospace vehicle.

FIG. 5 depicts the steps of a method 200 of regenerating the sorbent material 44 of sorbent regeneration device 100. A plurality of bypass valves 42, 46, 46a and 46b that are operative to selectively direct some or all of a hot airflow directed through sorbent material 44, 44a or CO sorbent material are employed and are controlled by controller 30 based on signals from air quality sensors 18, 40, 50.

Regeneration is performed by monitoring output of the air quality sensors 40, 50 disposed on opposite sides (upstream/downstream) of sorbent material 44, 44a of sorbent regeneration device 100 or CO2 sorbent material of CO2 removal device 68 (block 202). In one example, air quality sensors 40 and 50 are paired on opposite sides of (e.g., in an upstream/downstream relationship) of sorbent material 44, 44a, or CO2 sorbent material, respectively. In response to the monitored air quality, controller 30 operatively connected to a recirculation device 52, controls the operational setting of at least two bypass valves based on the one or more signals received from the at least one air quality sensors (block 204). In response to the monitored air quality or air quality value (e.g., difference between upstream and downstream air quality sensors 40, 50), (block 206) the controller 30 provides one or more signals activating one of the at least two bypass valves to selectively introduce hot air 56 to one or more sorbent materials 44, 44a and/or CO2 sorbent material and heating at least a portion of the one or more sorbent materials 44, 44a and/or CO2 sorbent material for time and a temperature capable of regeneration, e.g., removing at least one substance absorbed or associated with the sorbent. Regenerating at least a portion of the sorbent material 44, 44a and/or CO2 sorbent material is performed (block 208). For example, the regeneration step (block 208) for regenerating the sorbent material 44, 44a and/or CO2 sorbent material includes supplying hot air 56 or a combination of hot air 56 and vacuum pressure 54 to the sorbent regeneration device 100 or CO2 removal device 68 and directing airflow (with contaminants and/or CO2) to waste gas outflow/vacuum 54 via bypass valves 42, 46, 46a, 46b, 47, and 47a.

The controller 30 can comprise any sequential state machine operative to execute machine instructions stored as machine-readable computer programs in memory, such as one or more hardware-implemented state machines (e.g., in discrete logic, field programmable gate array (FPGA), application-specific integrated circuit (ASIC), etc.); programmable logic together with appropriate firmware, one or more stored-program, general-purpose processors, such as a microprocessor or Digital Signal Processor (DSP), or any combination of the above. The controller 30 is operative to receive inputs from air quality sensors 18, 24, 40, 50 and other components in the ECS 10. The controller 30 is also operative to generate control signal outputs that control the actuation of bypass valves 20, 42, 46, 46a and 46b as well as fans, motors, lamps, and the like (not shown), in response to one or more programs stored in memory 32. The memory 32, which can be internal to the controller 30 or can be separate, may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Controller 30 can communicate with various components, for example, components 16-28, 34, 40-56, 62 of FIG. 2, of the ECS 10 via wired or wireless links, either directly or through a communication bus according to a known protocol.

The present disclosure may, of course, be carried out in other ways than those specifically set forth herein without departing from the disclosure. The present examples are to be considered in all respects as illustrative and not restrictive, and all changes coming within the meaning and equivalency range of the appended claims are intended to be embraced therein.

What is claimed is:

1. An environmental control system comprising:
    a sorbent regeneration device comprising:
        at least one regenerative sorbent material operative to remove gas substances from air, the at least one regenerative sorbent material operatively coupled to receive hot air; and
        at least two bypass valves operative to selectively direct some or all of the hot air to the at least one regenerative sorbent material;
    one or more air quality sensors; and
    a controller operatively connected to the sorbent regeneration device, and the one or more air quality sensors, the controller operative to:
        determine an air quality value based on signals from the one or more air quality sensors; and
        control the at least two bypass valves in response to the air quality value.

2. The environmental control system of claim 1, wherein the sorbent regeneration device comprises at least two regenerative sorbent materials, and wherein the controller is further operative to selectively direct the hot air independently to one of the at least two regenerative sorbent materials.

3. The environmental control system of claim 1, wherein the controller is operative to control an amount of the hot air routed through the at least one regenerative sorbent material in response to the air quality value.

4. The environmental control system of claim 1, wherein the controller is further operative to apply vacuum pressure to the at least one regenerative sorbent material.

5. The environmental control system of claim 2, wherein the controller is further operative to selectively apply vacuum pressure independently to one or more of the at least two regenerative sorbent materials.

6. The environmental control system of claim 1, wherein the one or more air quality sensors are disposed on opposite sides of the at least one regenerative sorbent material.

7. The environmental control system of claim 1, wherein the sorbent regeneration device is operatively coupled to one or more particulate filters.

8. The environmental control system of claim 1, further comprising at least one of a volatile organic compound (VOC)/ozone converter and a carbon dioxide removal device.

9. The environmental control system of claim 1, wherein at least one of the at least two bypass valves is a three-way bypass valve.

10. The environmental control system of claim 1, wherein the hot air has a temperature of at least 150° F. (66° C.).

11. A sorbent regeneration device comprising:
- at least one regenerative sorbent material operative to remove gas substances from air, the at least one regenerative sorbent material operatively coupled to a source of hot air; and
- at least two three-way bypass valves operative to selectively direct some or all of the source of hot air into the at least one regenerative sorbent material, selectively direct some or all of a volume of air into or around the at least one regenerative sorbent material; and selectively direct some or all of the volume of air to an external environment;
- wherein the at least two three-way bypass valves are operatively coupled to a controller, the controller operative to control one or more of the two three-way bypass valves.

12. A method of regenerating a sorbent material of an environmental control system, the method comprising:
- monitoring air quality by receiving one or more signals from one or more air quality sensors;
- responding, via a controller operatively connected to at least two bypass valves and the one or more air quality sensors, to the one or more signals by:
  - (i) activating at least one of the at least two bypass valves so as to selectively introduce hot air to a regenerative sorbent material; and
  - (ii) heating at least a portion of the regenerative sorbent material for a time and a temperature capable of removing at least one substance therefrom; and
- regenerating at least the portion of the regenerative sorbent material.

13. The method of claim 12, further comprising operatively controlling an amount of the hot air routed through the regenerative sorbent material in response to the one or more air quality sensors.

14. The method of claim 13, wherein the amount of the hot air routed through the regenerative sorbent material is determined by the controller using one or more air quality sensors positioned on opposite sides of the regenerative sorbent material.

15. The method of claim 14, the method further comprising comparing, using the controller, two or more of the one or more signals from the one or more air quality sensors.

16. The method of claim 12, wherein regenerating the regenerative sorbent material further comprises applying vacuum pressure to the regenerative sorbent material.

17. The method of claim 12, wherein the regenerative sorbent material comprises at least two regenerative sorbents, the method further comprising controlling, using the controller, the hot air to flow to only one of the regenerative sorbent material.

18. The method of claim 17, further comprises applying vacuum pressure to only one of the regenerative sorbent material.

19. The method of claim 12, further comprising
- (i) activating at least one of the at least two bypass valves so as to selectively introduce hot air to a $CO_2$ removal device comprising $CO_2$ sorbent material; and
- (ii) heating and applying vacuum pressure to at least a portion of the regenerative sorbent material for a time and a temperature capable of removing $CO_2$ therefrom; and
- regenerating at least the portion of the $CO_2$ sorbent material.

20. The method of claim 12, further comprising:
- detecting an anomaly in one of the at least two bypass valves;
- outputting a signal indicative of the anomaly to an alert device coupled to a human interface;
- isolating the one bypass valve having the anomaly; and
- compensating for the anomaly in the one bypass valve.

* * * * *